(12) United States Patent
Kwon

(10) Patent No.: US 8,358,474 B2
(45) Date of Patent: Jan. 22, 2013

(54) IMAGING LENS AND CAMERA MODULE

(75) Inventor: Dukkeun Kwon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 96 days.

(21) Appl. No.: 12/967,955

(22) Filed: Dec. 14, 2010

(65) Prior Publication Data

US 2011/0181963 A1 Jul. 28, 2011

(30) Foreign Application Priority Data

Dec. 14, 2009 (KR) ........................ 10-2009-0124183

(51) Int. Cl.
*G02B 9/60* (2006.01)

(52) U.S. Cl. ...................................................... 359/764

(58) Field of Classification Search .......... 359/754–757, 359/763, 764; 396/72–88; 348/240.99–240.3, 348/335–369
See application file for complete search history.

(56) References Cited

U.S. PATENT DOCUMENTS 5,311,364 A * 5/1994 Kanoshima et al. .......... 359/756
2009/0122423 A1* 5/2009 Park et al. ..................... 359/764

* cited by examiner

*Primary Examiner* — Darryl J Collins

(74) *Attorney, Agent, or Firm* — Saliwanchik, Lloyd & Eisenschenk

(57) ABSTRACT

Provided is an imaging lens and a camera module, the device including in an orderly way from an object side, a first lens with positive (+) refractive power; a second lens with negative (–) refractive power; a third lens with negative (–) refractive power; a fourth lens with negative (–) refractive power; and a fifth lens with negative (–) refractive power, wherein the lens is concavely formed at an object side surface.

17 Claims, 4 Drawing Sheets

IMAGING LENS AND CAMERA MODULE

CROSS-REFERENCE TO RELATED APPLICATION

This application claims the benefit under 35 U.S.C. §119 of Korean Application No. 10-2009-0124183, filed on Dec. 14, 2009, which is hereby incorporated by reference in its entirety.

BACKGROUND OF THE DISCLOSURE

1. Field of the Invention

The present invention relates to an image lens and a camera module, and in particular, to an image lens for an image lens adequate for a camera module using a high-resolution image sensor and the camera module.

2. Discussion of the Related Art

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such an image pickup system obtains an image is an imaging lens producing an image.

Previously, there have been attempts to construct an imaging lens of high-resolution by using 5 pieces of lenses. Each of 5 pieces of lenses is comprised of lenses with a positive (+) refractive power and lenses with a negative (−) refractive power. For example, an imaging lens is constructed on a structure of PNNPN (+−−+−), PNPNN (+−+−−) or PPNPN (++−+−) in order starting from an object side. However, an imaging module of such a framework fails to show approving optic characteristics or aberration characteristics. Accordingly, a high-resolution imaging lens of a new power structure is required.

BRIEF SUMMARY

The present invention provides an imaging lens and a camera lens having a new power structure, especially, it provides an imaging lens and a camera module excellent in aberration characteristic.

An image lens according to one embodiment of the present invention comprises a first lens having positive (+) refractive power, a second lens having negative (−) refractive power, a third lens having negative (−) refractive power, a fourth lens having negative (−) refractive power, and a fifth lens having negative (−) refractive power in an orderly way from an object side, wherein the third lens is concavely formed about an object side surface.

An imaging lens according to the present embodiment is formed of a lens in which a first lens has positive (+) power, and a second through a fifth lenses has negative (−) power, and it provides an imaging lens, that is, a power structure of PNNNN. An imaging lens superb in aberration characteristic may be realized.

A camera module of the invention comprises a lens group including a first lens having positive (+) refractive power, a second lens having negative (−) refractive power and a third through a fifth lenses being all aspheric planes at an object side and an imaging side, in an order from the object side; a filter transmitting light visible rays and reflecting infrared from light passed through the lens group; and a light reception device receiving light visible rays passed through the filter.

DETAILED DESCRIPTION

Figure 1:
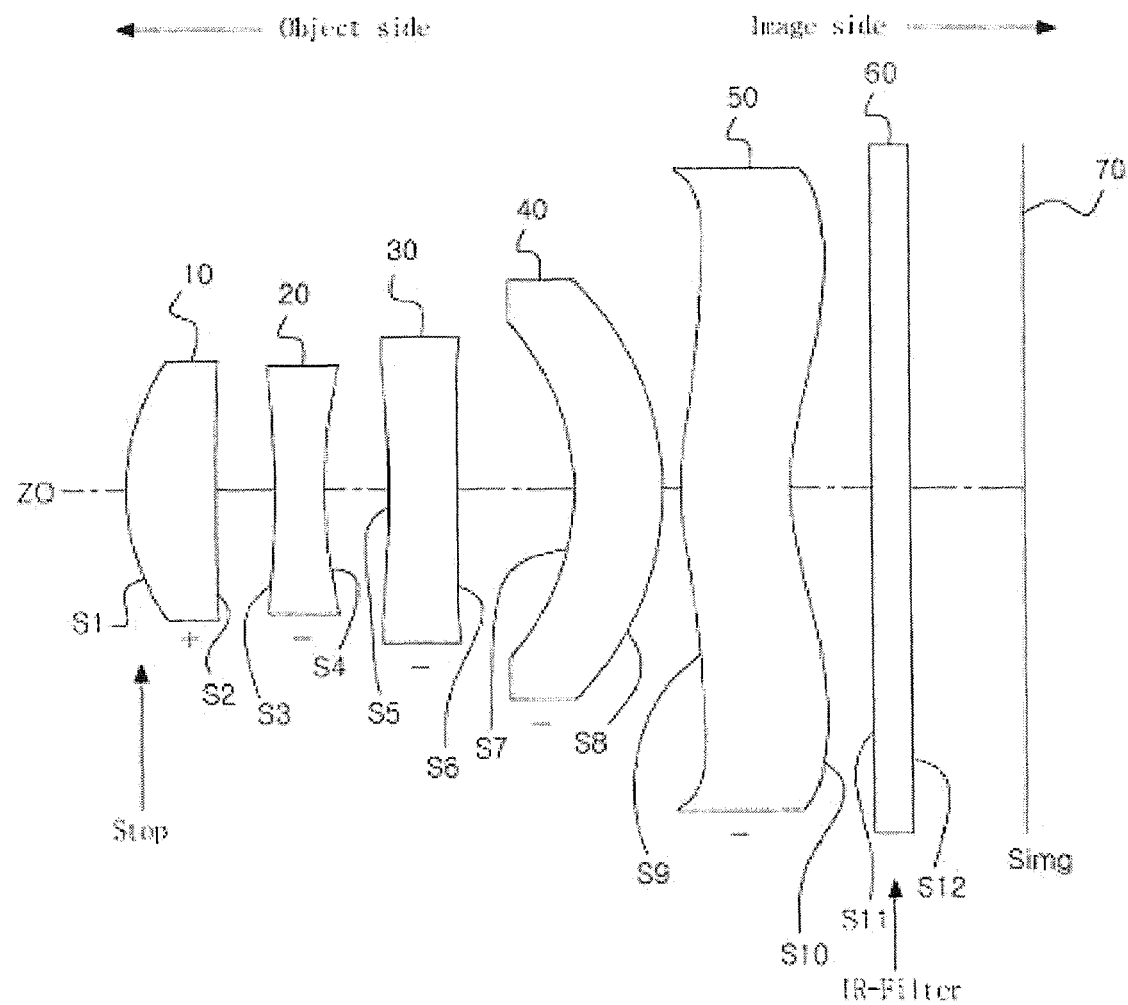
FIG. 1 is a construction diagram of an imaging lens according to the present embodiment.

Since the present invention can be applied with various changes thereto and have several types of embodiments, specific embodiments intend to be exemplified in the drawings and minutely described in the detailed description. However, it does not limit the present invention to a specific example but should be appreciated to include all the changes, equivalents and replacements which fall in the spirit and technical scope of the present invention.

Stated that any component is "connected" or "conjunctive" to another component, it will be appreciated to be directly connected or conjunctive to the very another component or otherwise that there exists any component in the midst of them.

In the following, the present invention will be described in detail referring to the attached drawings, but without regard to a drawing sign, an identical or corresponding component is assigned the same reference numeral and a redundant description regarding this will be omitted.

As a construction diagram of a camera lens module according to the present embodiment, FIG. 1 is a lateral surface construction diagram exemplifying a layout state of a lens around an optical axis ZO. In the construction of FIG. 1, a thickness, size, and shape of a lens are rather overdrawn for description, and a spheric or aspheric shape has been only presented as one embodiment, but obviously not limited to this shape.

Referring to FIG. 1, an imaging lens of the present invention has a layout construction with a first lens 10, a second lens 20, a third lens 30, a fourth lens 40, a fifth lens 50, a filter 60, and a light receiving element 70 in an order from an object side.

Light corresponding to image information of a subject passes through the first lens 10, the second lens 20, the third lens 30, the fourth lens 40, the fifth lens 50, and the filter 60 to be incident on the light receiving element 70.

Hereinafter, in description of a construction of each lens, "object side surface" means a surface of a lens facing an object side to an optical axis, and "image side surface" means a surface of a lens facing an image surface to an optical axis.

A first lens 10 has positive (+) refractive power and its object side surface S1 is convexly formed. An object side surface S1 of a fourth lens 10 may act as an aperture, and in this case, an imaging lens of the present embodiment may not need an additional aperture. Also, an aperture 20 is negative (−) refractive power, and its object side surface S3 is concavely formed.

A third lens 30, a fourth lens 40 and a fifth lens 50 are all constructed of an aspheric face at an object side surface and an imaging side surface. A third lens 30 and a fourth lens 40 have negative (−) refractive power, and a fifth lens 50 has a refractive power in negative value.

As shown in the figure, a third lens 30 is a meniscus form being an object side surface S5 concavely formed. The fourth lens 40 is a meniscus form in which an object side surface S7 is concavely formed, and a fifth lens 50 is a meniscus form in which an object side surface S9 is convexly formed.

Here, a fifth lens 50 is an aspheric form in which both surfaces of an object side surface S9 and an imaging side surface S10 are all given inflection points. As shown in the figure, an imaging side surface S10 of a fifth lens 50 is bent towards an imaging side as heading from a central part which is centered on an optical axis ZO to a surrounding, and again forms an aspheric inflection point by bending into an object side as marching from a surrounding part which is far away off an optical axis ZO to an outermost angle area.

An aspheric inflection point formed at a fifth lens 50 may adjust a maximum emergence angle of a primary ray incident on a light receiving element 70. And, an aspheric inflection point formed at an object side surface S9 and an imaging side surface S10 of a fifth lens 50 adjusts a maximum emergence angle of a primary ray, and inhibits a shading of a surrounding part of a screen.

The filter 60 is at least any one of optical filters such as an infrared filter and a cover glass. A filter 40, in a case an infrared filter is applied, blocks such that radiating heat emitting from external light does not transfer to the light receiving element 70. Also, an infrared filter penetrates visible light and reflects infrared for outflow to an external part.

The light receiving element 70 is an imaging sensor such as CCD (Charge Coupled Device) or CMOS (Complementary Metal Oxide Semiconductor).

The first lens 10, the second lens 20, the third lens 30, the fourth lens 40 and the fifth lens 50 use an aspheric lens like a later-described embodiment, thereby improving resolution of a lens and taking an advantage of superior aberration characteristic.

A later-described conditions and embodiment is a preferred embodiment raising an action and effect, and it would be understood by a person in the art that the present invention should be constructed of the following conditions. For example, a lens construction of the invention will have a raised action and effect only by satisfying part of conditions among lower-part described condition equations.

$0.5 < f1/f < 1.5$ [Condition 1]

$0.5 < T/f < 1.5$ [Condition 2]

$1.6 < N2 < 1.7$ [Condition 3]

$20 < V2 < 30$ [Condition 4]

where, f: overall focal length of imaging lens
f1: focal length of first lens
T: distance from object side surface of first lens to image-forming surface
N2: refractive index of second lens
V2: Abbe value of second lens Condition 1 specifies refractive power of a first lens 10. The first lens 10 has a refractive power having proper spherical aberration and proper chromatic aberration corrected by Condition 1. Condition 2 specifies a dimension of an optical axis direction of an overall optical system, that is, defines a sub-miniature lens related condition and a proper aberration correction related condition.

Condition 3 specifies reflective index of a second lens 20, and Condition 4 specifies Abbe number of a second lens 20. Specification of reflective index and Abbe number of each lens is conditions for satisfactorily correcting chromatic aberration.

Hereinafter, an action and effect of the present invention will be presented with reference to a specific embodiment. An aspheric shape mentioned in the following embodiment is obtained from a known Equation 1, where k denotes Conic constant and 'E and its continuing number' used in aspheric coefficient A, B, C, D, E, F denotes power of 10. For example, E+01 indicates $10^1$, and E-02 indicates $10^{-2}$.

$$z = \frac{cY^2}{1 + \sqrt{1 - (1+K)c^2Y^2}} + AY^4 + BY^4 + CY^4 + DY^4 + EY^4 + FY^4 + ...$$ [Equation 1]

where, z: distance in optical axis direction from top point of lens
c: basic curvature of lens
Y: distance in perpendicular direction to optical axis
K: Conic constant
A, B, C, D, E, F: aspheric coefficient Embodiment The following Table 1 shows an embodiment complying with the above-described Condition.

TABLE 1

|  | Embodiment |
| --- | --- |
| f | 5.78 |
| f1 | 3.36 |
| f2 | −6.84 |
| f3 | −100 |
| f4 | −100 |
| f5 | −100 |
| f1/f | 0.58 |
| T | 6.44 |
| T/f | 1.11 |
| N2 | 1.62 |
| V2 | 26 |

Referring to Table 1, f1/f is 0.581, so that it can be known to match with Condition 1, T/f is 1.11, and thus matching to Condition 2 can be known. Also, refractive index N of a second lens 20 complies with Condition 3, and it can be appreciated that Abbe number V2 of a second lens 20 matches to Condition 4.

An embodiment of Table 2 shows a more specific embodiment over an embodiment of Table 1.

TABLE 2

| Surface number | Curvature Radius (R) | Thickness or Distance (d) | Refractive index (N) |
| --- | --- | --- | --- |
| 1* | 1.9 | 0.70 | 1.59 |
| 2* | 22.7 | 0.20 |  |
| 3* | −13.1 | 0.40 | 1.61 |
| 4* | 6.4 | 0.44 |  |
| 5* | −16.6 | 0.56 | 1.53 |
| 6* | −24.4 | 0.76 |  |
| 7* | −1.7 | 0.70 | 1.53 |
| 8* | −2.0 | 0.10 |  |
| 9* | 2.3 | 0.85 | 1.53 |
| 10* | 1.9 | 0.56 |  |
| 11 |  | 0.30 | 1.52 |
| 12 |  | 0.88 |  |
| image |  | −0.02 |  |

In the above Table 2 and the following Table 3, notation * stated next to surface numbers indicates an aspheric surface.

The following Table 3 indicates a value of an aspheric coefficient of each lens in an embodiment of the Table 2.

TABLE 3

| Surface Number | k | A | B | C | D | E | F |
|---|---|---|---|---|---|---|---|
| 1* | 0.031132 | 0.530590E-0 | 0.454248E-02 | -0.977041E-03 | 0.112390E-02 | -0.763141E-04 | |
| 2* | 0 | 0.138110E-02 | -0.242609E-02 | -0.183146E-02 | -0.229414E-02 | 0.141290E-02 | |
| 3* | 0 | -0.470439E-02 | -0.681563E-02 | -0.145754E-02 | 0.240966E-02 | -0.141168E-03 | |
| 4* | 0 | 0.144273E-01 | 0.742174E-02 | 0.307285E-02 | 0.109284E-02 | 0.728490E-02 | |
| 5* | 0 | -0.109635E-01 | -0.263756E-02 | 0.627748E-03 | 0.268656E-02 | -0.381210E-03 | |
| 6* | 0 | 0.114874E-01 | -0.207353E-02 | 0.353580E-02 | 0.212405E-02 | -0.425894E-03 | |
| 7* | -8.247871 | -0.842418E-01 | -0.639694E-02 | 0.108078E-01 | -0.440222E-03 | -0.190031E-03 | |
| 8* | -0.234956 | -0.145469E-01 | -0.137677E-02 | 0.375517E-02 | 0.973959E-03 | -0.374778E-03 | |
| 9* | -1.438254 | -0.133117E+00 | 0.498423E-01 | -0.105833E-01 | 0.122936E-02 | -0.587350E-04 | -0.657907E-06 |
| 10* | -3.754230 | -0.636660E-01 | 0.190847E-01 | -0.370502E-02 | 0.393843E-03 | -0.185263E-04 | -0.636154E-09 |

Figure 2:
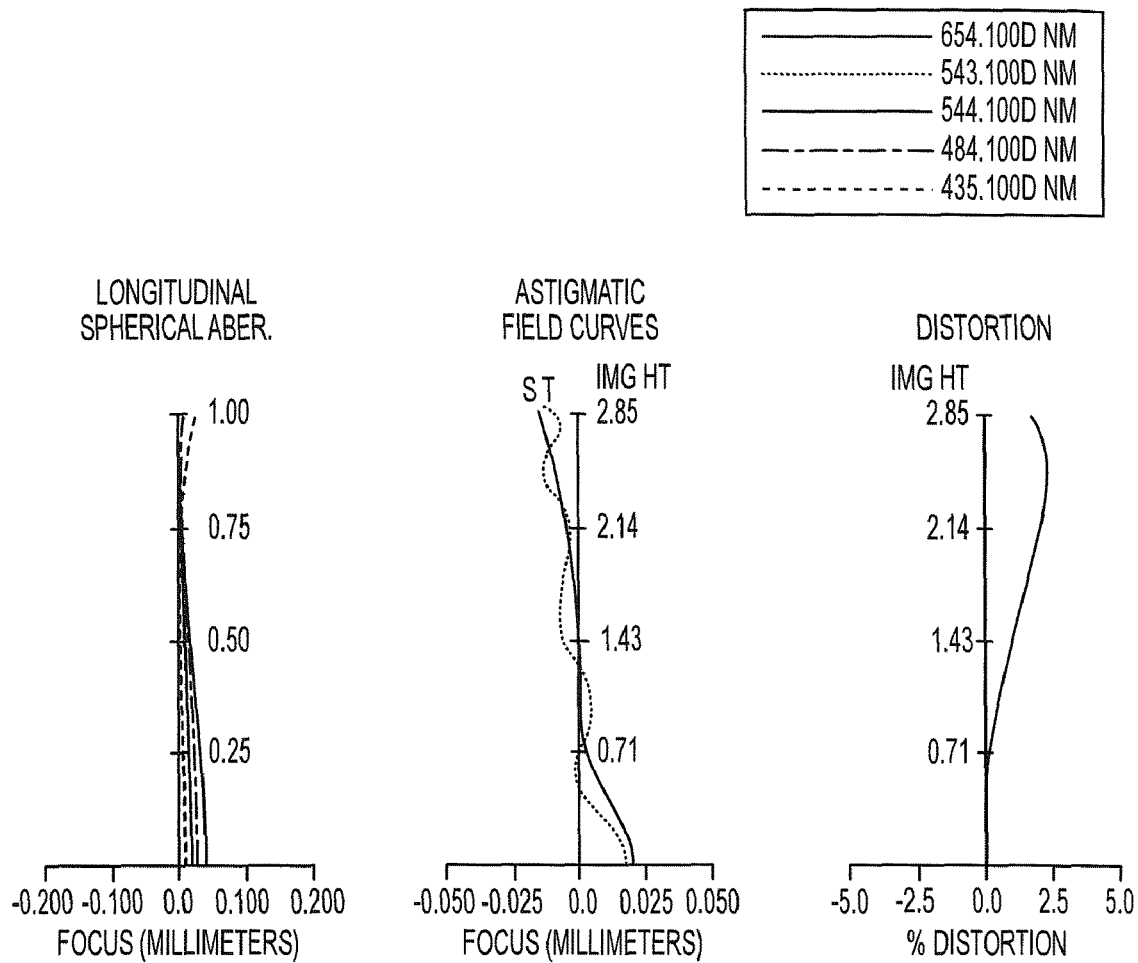
FIG. 2 is a graph showing aberration characteristic according to one embodiment of the present invention.

As a graph measuring coma aberration, FIG. 2 is a graph measuring tangential aberration and sagittal aberration of each wavelength based on a field height.

In FIG. 2, as a graph showing a test result approaches to an X axis at a positive axis and a negative axis, respectively, it is explained that a coma aberration correction function is good. In measurement examples of FIG. 2, a value of images in nearly all fields appear proximate to an X axis, it is explained that all of them show a superior commatic aberration correction function.

In FIG. 2, a Y axis means size of an image, and an X axis means focal distance (unit: mm) and distortion degree (unit: %). In FIG. 2, it is interpreted that an aberration correction function is good as curves approach to the Y axis. In a shown aberration diagram, because a value of images in nearly all fields appears proximate to the Y axis, and longitudinal spherical aberration, astigmatic field curves, and distortion all show a superior figure.

Figure 3A:
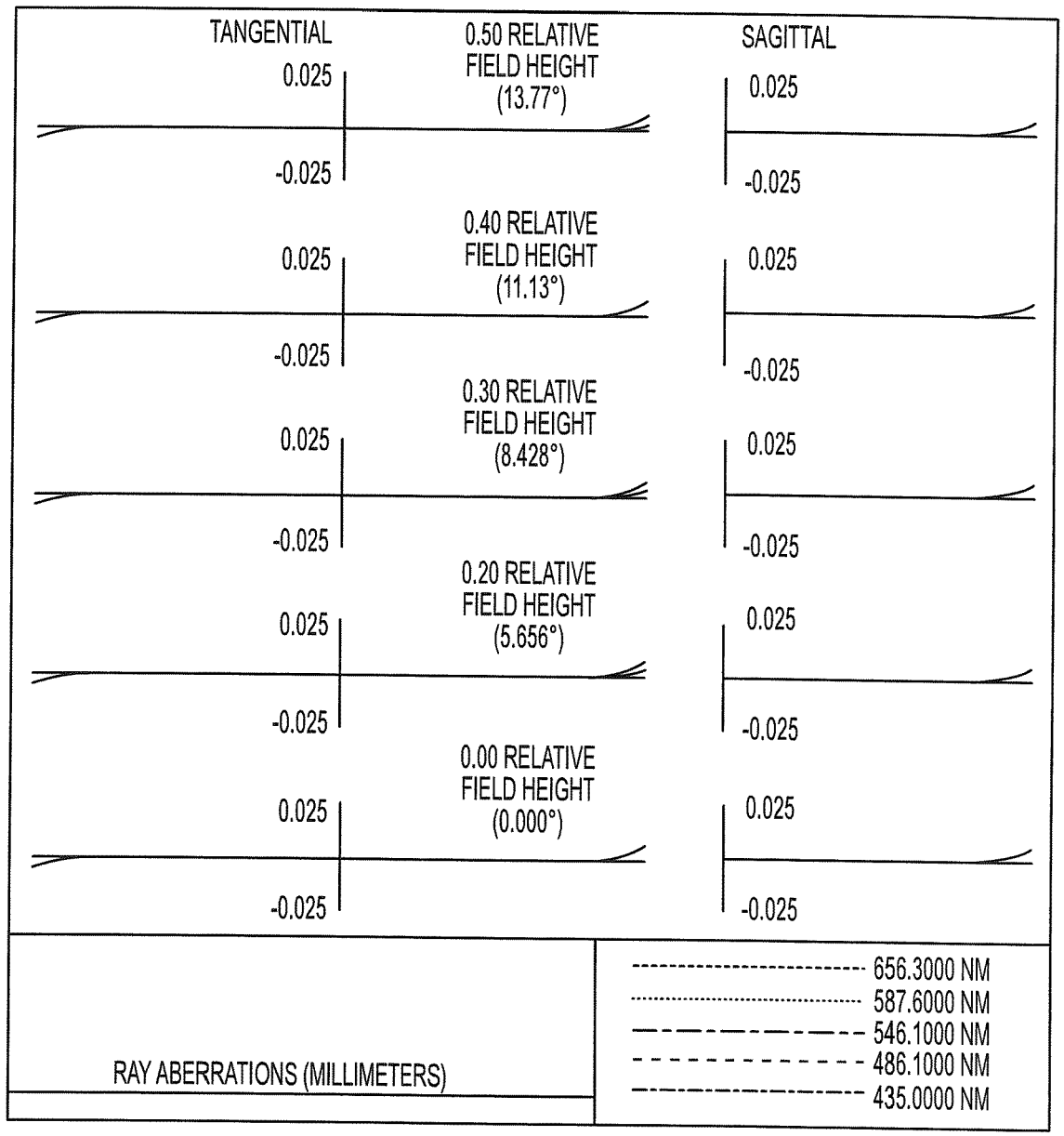
FIG. 3a and FIG. 3b are graphs showing Coma aberration according to one embodiment of the present invention.
Figure 3B:
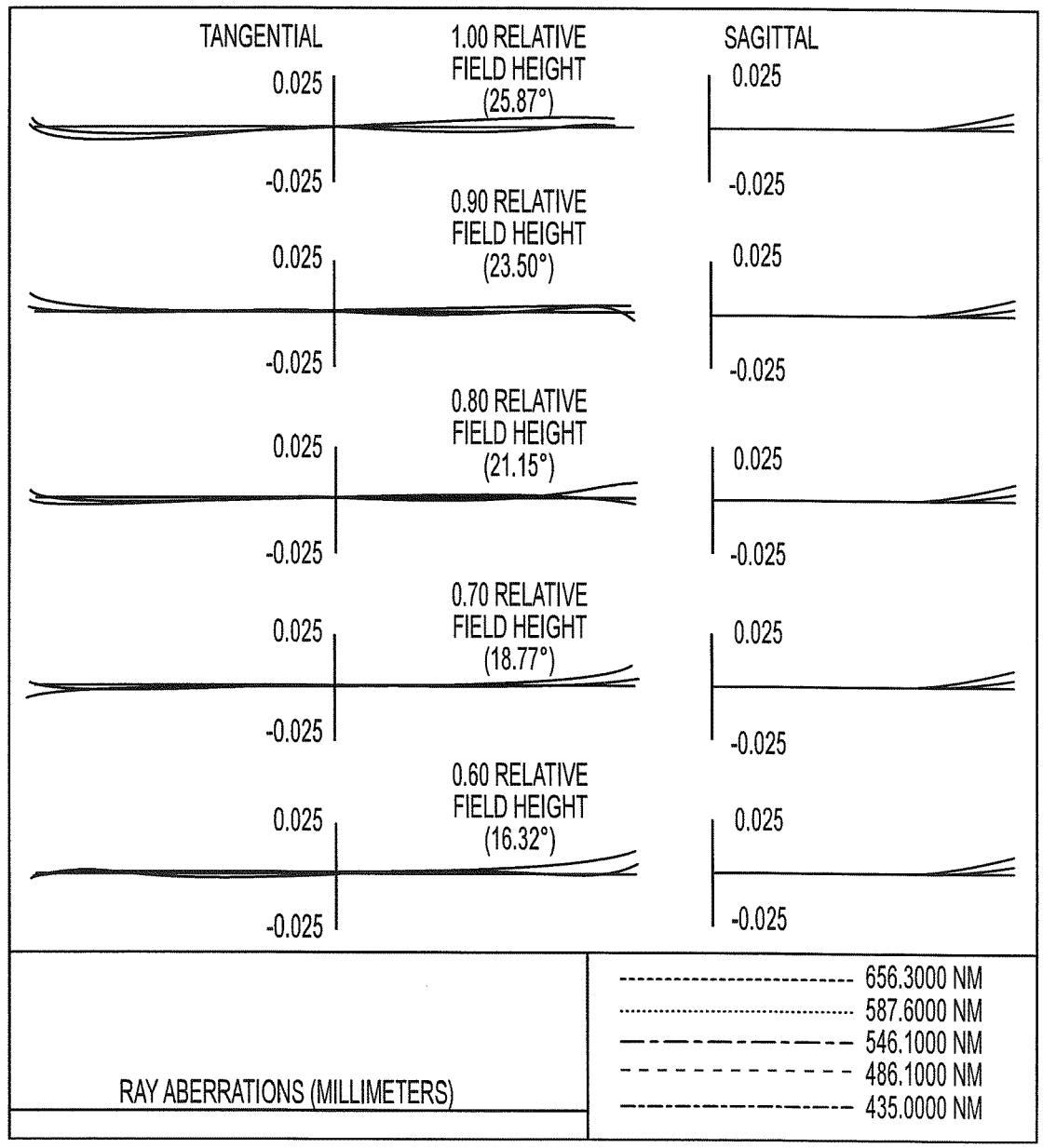

As a graph measuring coma aberration, FIGS. 3a and 3b are graphs measuring tangential aberration and sagittal aberration of each wavelength based on a field height. In FIGS. 3a and 3b, as a graph showing a test result approaches to an X axis at a positive axis and a negative axis, respectively, it is explained that a coma aberration correction function is good. In measurement examples of FIG. 3, a value of images in nearly all fields appear proximate to an X axis, it is explained that all of them show a superior commatic aberration correction function.

While the present invention has been described with reference to embodiments in the above part, it would be understood by those skilled in the art that various changes and modifications can be made without departing from the spirit or scope of the present invention. Therefore, not confined to the above-described embodiment, the invention would be asserted to include all embodiments within the scope of the accompanying claims.

What is claimed is:

1. An imaging lens, comprising in an orderly way from an object side:
   a first lens with positive (+) refractive power;
   a second lens with negative (−) refractive power;
   a third lens with negative (−) refractive power;
   a fourth lens with negative (−) refractive power; and
   a fifth lens with negative (−) refractive power,
   wherein the third lens is concavely formed at an object side surface, and
   wherein the fifth lens is convexly formed at an object side surface.

2. The imaging lens of claim 1, wherein the third lens, the fourth lens and the fifth lens are all imaging lenses having aspheric faces at an object side surface and an imaging side surface.

3. The imaging lens of claim 1, wherein the fourth lens is concavely formed at an object side surface.

4. The imaging lens of claim 1, wherein the fifth lens is formed with an inflection point at each of an object side surface and an imaging side surface.

5. The imaging lens of claim 4, wherein the inflection point is an aspheric inflection point.

6. The imaging lens of claim 1, wherein the third lens, the fourth lens and the fifth lens are lenses of a meniscus form.

7. The imaging lens of claim 1, wherein when an overall focal length of the imaging lens is f, and a focal length of the first lens is f1, the imaging lens satisfies a condition of $0.5 < f1/f < 1.5$.

8. The imaging lens of claim 1, wherein the imaging lens satisfies a condition of $0.5 < T/f < 1.5$, when an overall focal length of the imaging lens is f, and a distance from an object side surface of the first lens to an image-forming surface is T.

9. The imaging lens of claim 1, wherein the imaging lens satisfies a condition of $1.6 < N2 < 1.7$, when a refractive power of the second lens is N2.

10. The imaging lens of claim 1, wherein the imaging lens satisfies a condition of $20 < V2 < 30$, when an Abbe number of the second lens is V2.

11. A camera module comprising:
   a lens group including a first lens having positive (+) refractive power, a second lens having negative (−) refractive power and a third through a fifth lenses being all aspheric planes at an object side and an imaging side, in an order from the object side;
   a filter transmitting light visible rays and reflecting infrared from light passed through the lens group; and
   a light reception device receiving light visible rays passed through the filter,
   wherein the fifth lens has all aspheric inflection points at the object side surface and an imaging side surface.

12. The camera module of claim 11, wherein the third through fifth lenses have negative (−) refracting power.

13. The camera module of claim 11, wherein the third lens is concave at the object side.

14. The camera module of claim 11, wherein the fourth lens is concavely formed at the object side, and the fifth lens is convexly formed at the object side.

15. The camera module of claim 11, wherein the camera module satisfies a condition of $0.5 < f1/f < 1.5$, when an overall focal distance of the lens group is f, and a focal distance of the first lens is f1.

16. The camera module of claim 11, wherein the camera module satisfies a condition of $0.5 < T/f < 1.5$, when an overall focal distance of the lens group is f, and a distance from the object side to an image-forming surface of the first lens is T.

17. The camera module of claim 11, wherein the camera module satisfies a condition of $1.6 < N2 < 1.7$, when a refractive index of the second lens is N2.

* * * * *